United States Patent [19]
Fuller

[11] 3,850,072

[45] Nov. 26, 1974

[54] IMPROVEMENTS IN OR RELATING TO INSTRUCTIONAL APPARATUS FOR USE IN LEARNING THE CONSTRUCTION OF MUSICAL CHORDS

[76] Inventor: Dudley Kilburn Maurice Fuller, 18 Addison Way, London N.W. 11, England

[22] Filed: Sept. 5, 1972

[21] Appl. No.: 286,226

[52] U.S. Cl. .................. 84/471, 84/473, 84/478
[51] Int. Cl. ................. G09b 15/02, G10b 15/00
[58] Field of Search ............... 84/470–473, 84/477, 478

[56] References Cited
UNITED STATES PATENTS

| | | | |
|---|---|---|---|
| 1,017,045 | 2/1912 | French et al. ................. | 84/478 UX |
| 2,332,842 | 10/1943 | Champion ....................... | 84/473 |
| 2,452,748 | 11/1948 | Grosch .......................... | 84/473 |
| 3,592,099 | 7/1971 | Gibby ........................... | 84/471 X |
| 3,677,130 | 7/1972 | Petreycik ....................... | 84/471 |
| 3,691,895 | 9/1972 | Nessler ......................... | 84/471 |

FOREIGN PATENTS OR APPLICATIONS 1,218,266   6/1966   Germany ......................... 84/471

*Primary Examiner*—Stephen J. Tomsky
*Attorney, Agent, or Firm*—McGlew and Tuttle

[57] ABSTRACT

An instructional apparatus for use in learning the construction of musical chords, made up of a number of sliding members so constructed that symbols show through apertures, whereby the required information is given. Provision for transportation can be provided, as can be key information and the cycle of keys.

4 Claims, 24 Drawing Figures

IMPROVEMENTS IN OR RELATING TO INSTRUCTIONAL APPARATUS FOR USE IN LEARNING THE CONSTRUCTION OF MUSICAL CHORDS

FIELD OF THE INVENTION

This invention relates to an instructional apparatus for use in learning the construction of musical chords.

SUMMARY OF THE INVENTION

According to one aspect of the present invention there is provided an instructional apparatus for converting a chord symbol into its constituent notes, which apparatus comprises a member bearing a representation of a chromatic sequence of notes and having means associated therewith for indicating individual notes or combinations of notes, the arrangement being such that, by selecting the keynote and, where necessary, the interval indicated by the chord symbol, the constituent notes of the chord symbol are indicated on the representation of the chromatic sequence of notes.

According to a further aspect of the present invention there is provided an instructional apparatus for converting a chord symbol into its constituent notes which apparatus comprises an outer cover bearing a representation of a keyboard of the pianoforte type, the outer cover being provided with an aperture or window in each key, and a transverse sliding member comprising a base or master slide carrying a series of planar members bearing markings adapted to register with the apertures or windows in the keyboard, the planar members being transversely slideable on the master slide and each planar member being provided with means for enabling the same to be slid, and an indicator member attached to the master slide and provided with parallelly spaced slots in predetermined positions with intervals to accommodate the enabling means, the arrangement being such that the sliding member may be moved relatively with respect to the keyboard into a selected position according to the keynote indicated by a chord symbol, after which one or more such enabling means attached to the planar members may be moved to an appropriate position in the slot of the indicator member according to the interval in the chord symbol, so that appropriate markings on the planar members appear in the apertures or windows of appropriate keys, indicating the constituent notes of the chord symbol required.

It will be appreciated that the invention enables a user to determine rapidly and easily the constituent notes of a musical chord, in any key, which has been represented on a musical score by a chord symbol. Such chord symbols fundamentally comprise a keynote on which there is based a chord symbolising a triad of the keynote with its major third and its perfect fifth, and usually one or more interval symbols complementary to the keynote which may add notes to the chord or alter the intervals of the triad. Herein, these two parts of the chord symbol will be referred to as the keynote and the interval.

With the present invention, it is possible to represent all chords in all keys on a single device, and this is a marked improvement on existing methods of determining the composition of chord symbols, which existing methods generally entail representing separately on paper each symbol with its corresponding combination of notes.

Moreover, an apparatus according to the invention is suitable for aiding a beginner to play chords from any given chord symbols, to learn the construction of chords and to construct his (or her) own chords. The device will also aid him (or her) to extemporise, and to vamp to most tunes from normal modern sheet music without necessarily being able to read musical notation.

The above brief description and other objects, features and advantages of the present invention will be more fully appreciated and apparent from a consideration of the following detailed description when taken in conjunction with the accompanying drawings.

BRIEF DESCRIPTION OF THE DRAWINGS

In the Drawings

FIGS. 3A – 10A are plan views and FIGS. 3B – 10B are corresponding side elevation views, of the eight slide assemblies shown in FIG. 1 and each including a respective panel cut from the strip shown in FIG. 2;

DESCRIPTION OF THE PREFERRED EMBODIMENTS

Figure 11:
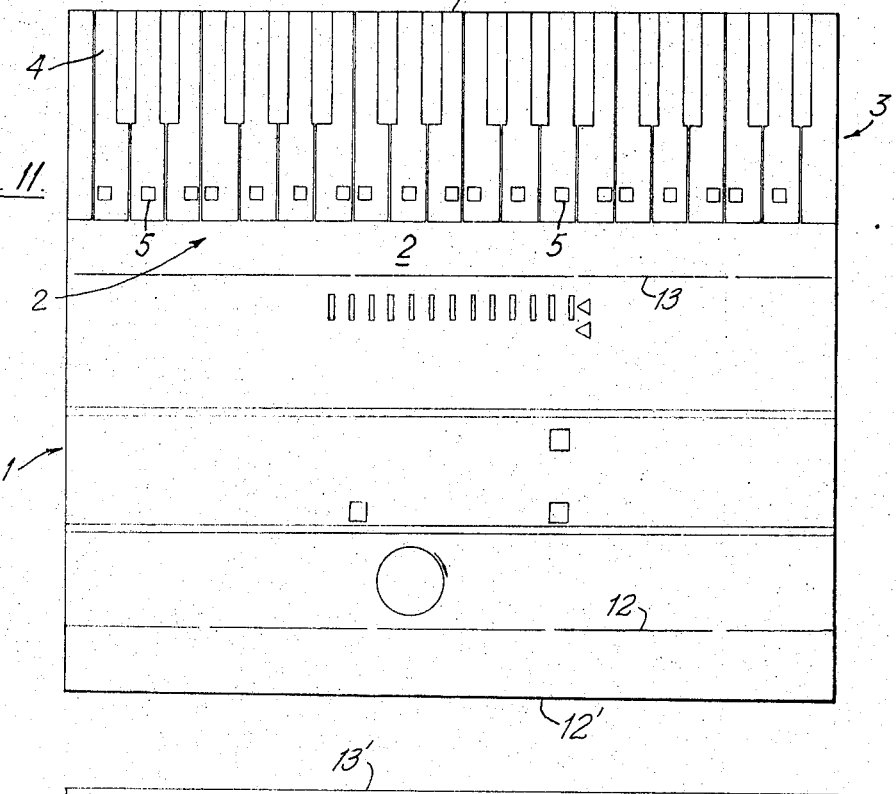
FIG. 11 is a plan view of a foldable member, adapted to form an outer case of the apparatus, before folding thereof.
Figure 12:
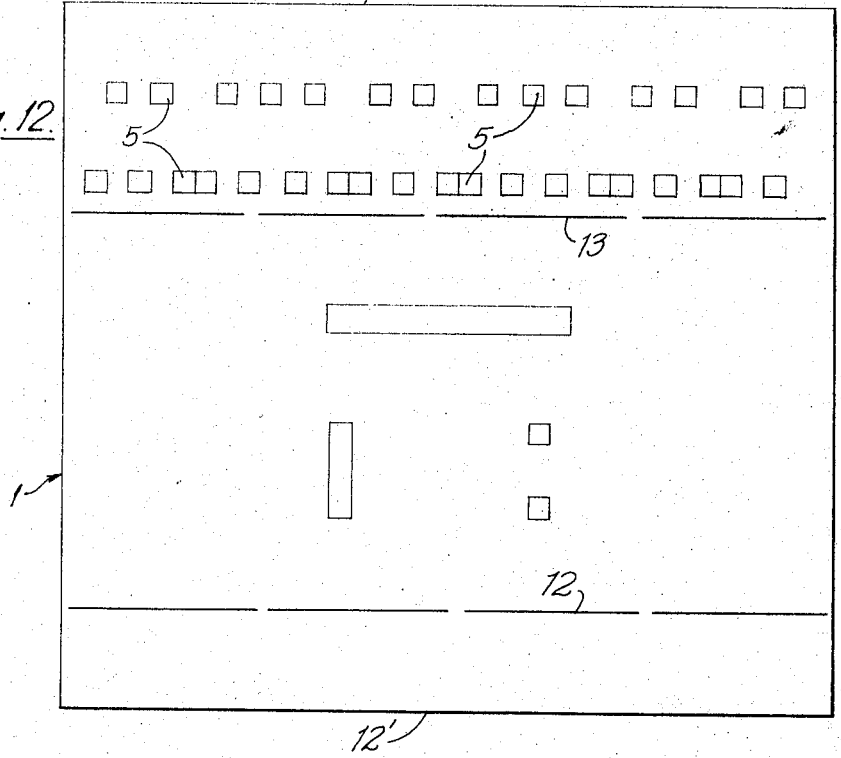
FIG. 12 is a plan view of the opposite surface of the member shown in FIG. 11.

As shown in FIGS. 11 and 12, the apparatus comprises an outer case member or casing 1 having a cover portion 2 on which is imprinted a representation 3 of part of the piano-type keyboard. Each key 4 is provided with an aperture or window 5. The twelve keys representing the lowest notes have their appropriate musical letters and symbols written at the end of the key remote from the playing position. The series of keys 4 provide a chromatic sequence.

Figure 17:
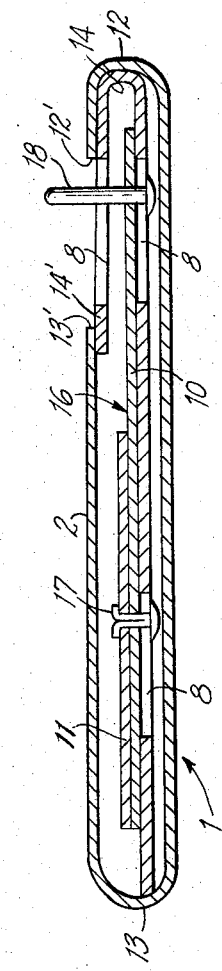
FIG. 17 is a transverse sectional view taken on the line 17—17 of FIG. 14.
Figure 3A:
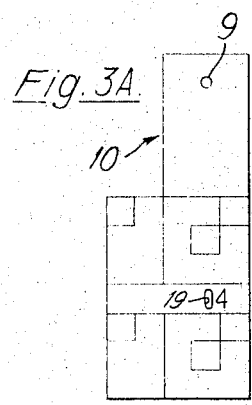
Figure 3B:
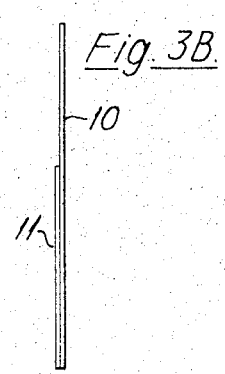
Figure 4A:
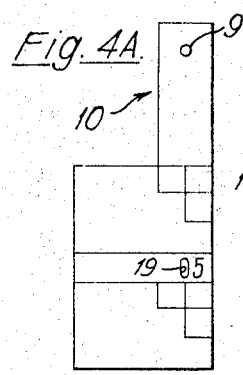
Figure 4B:
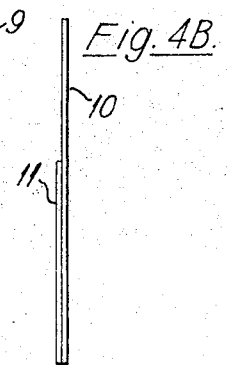
Figure 5A:
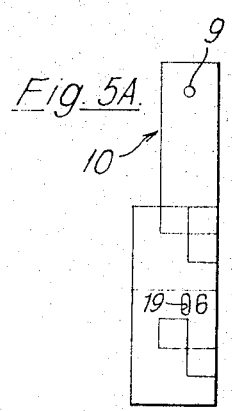
Figure 5B:
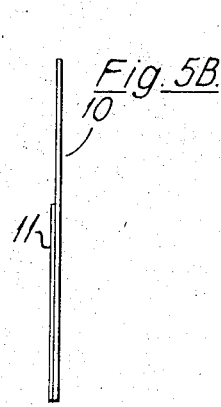
Figure 6A:
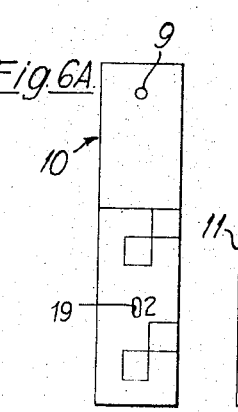
Figure 6B:
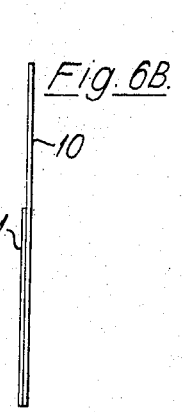
Figures 7A, 7B:
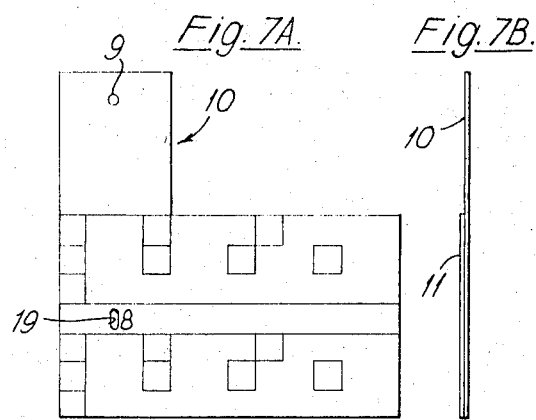
Figures 8A, 8B:
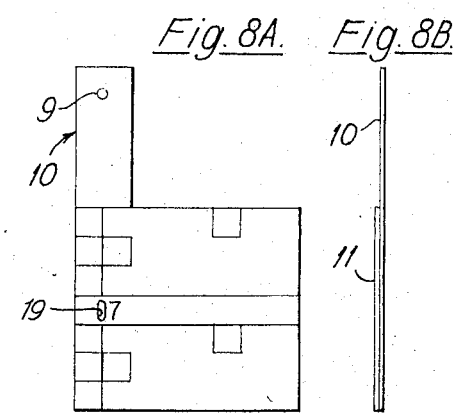
Figures 9A, 9B:
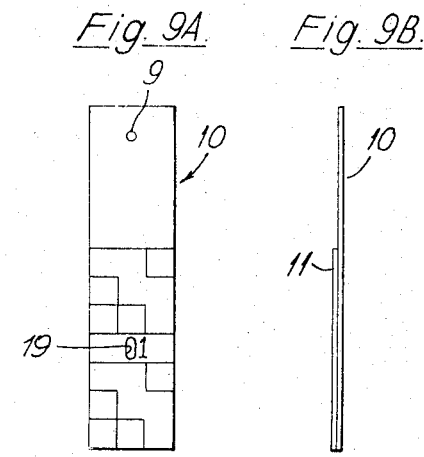
Figures 10A, 10B:
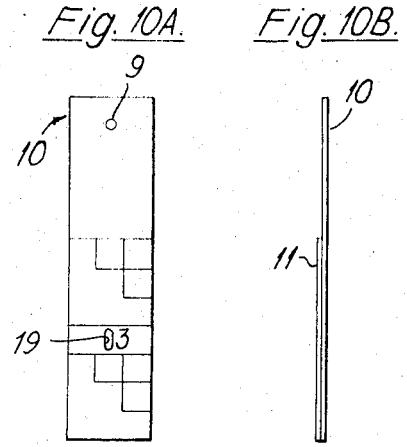
Figure 14:
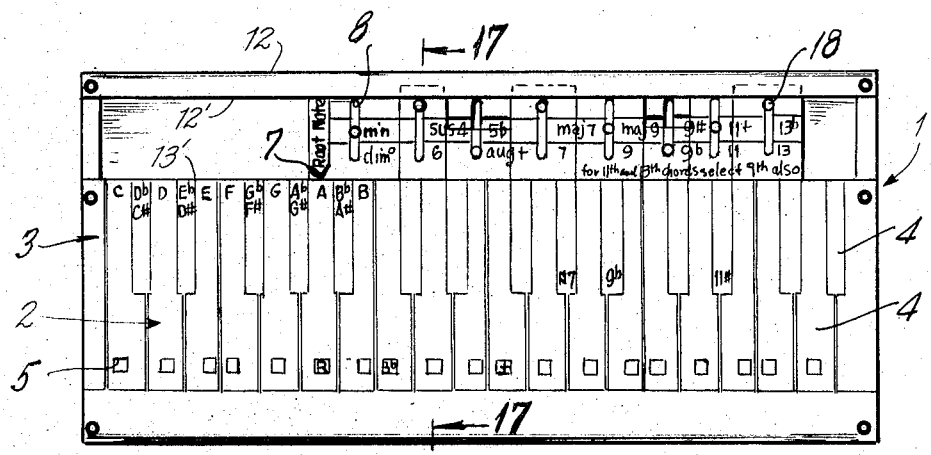
FIG. 14 is a front elevation view of the assembled apparatus.
Figure 15:
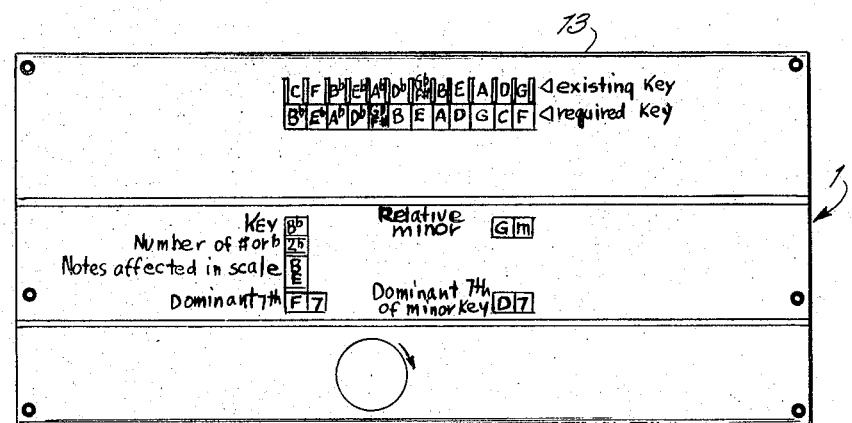
FIG. 15 is a rear elevation view of the assembled apparatus.
Figure 16:
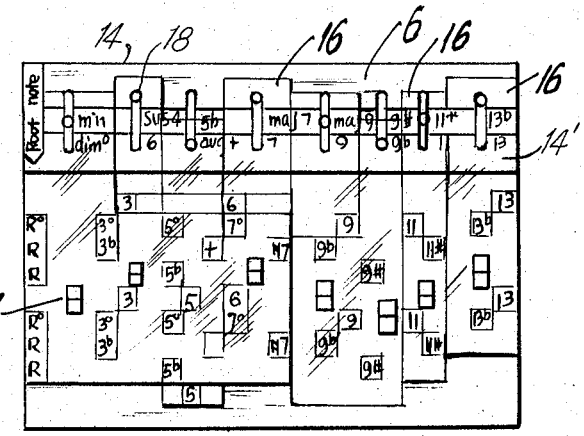
FIG. 16 is a plan view of the master slide with the slide assemblies mounted thereon.

Member 1 is arranged to be folded backwardly, as viewed in FIG. 11, or forwardly, as viewed in FIG. 12, about fold lines 12 and 13 so that, when so folded, the respective edges 12' and 13' nearest these fold lines define a guide slot or track as best seen in FIGS. 14 and 17. The folded parts may be secured together by suitable means such as eyelets or rivets.

Figure 1:
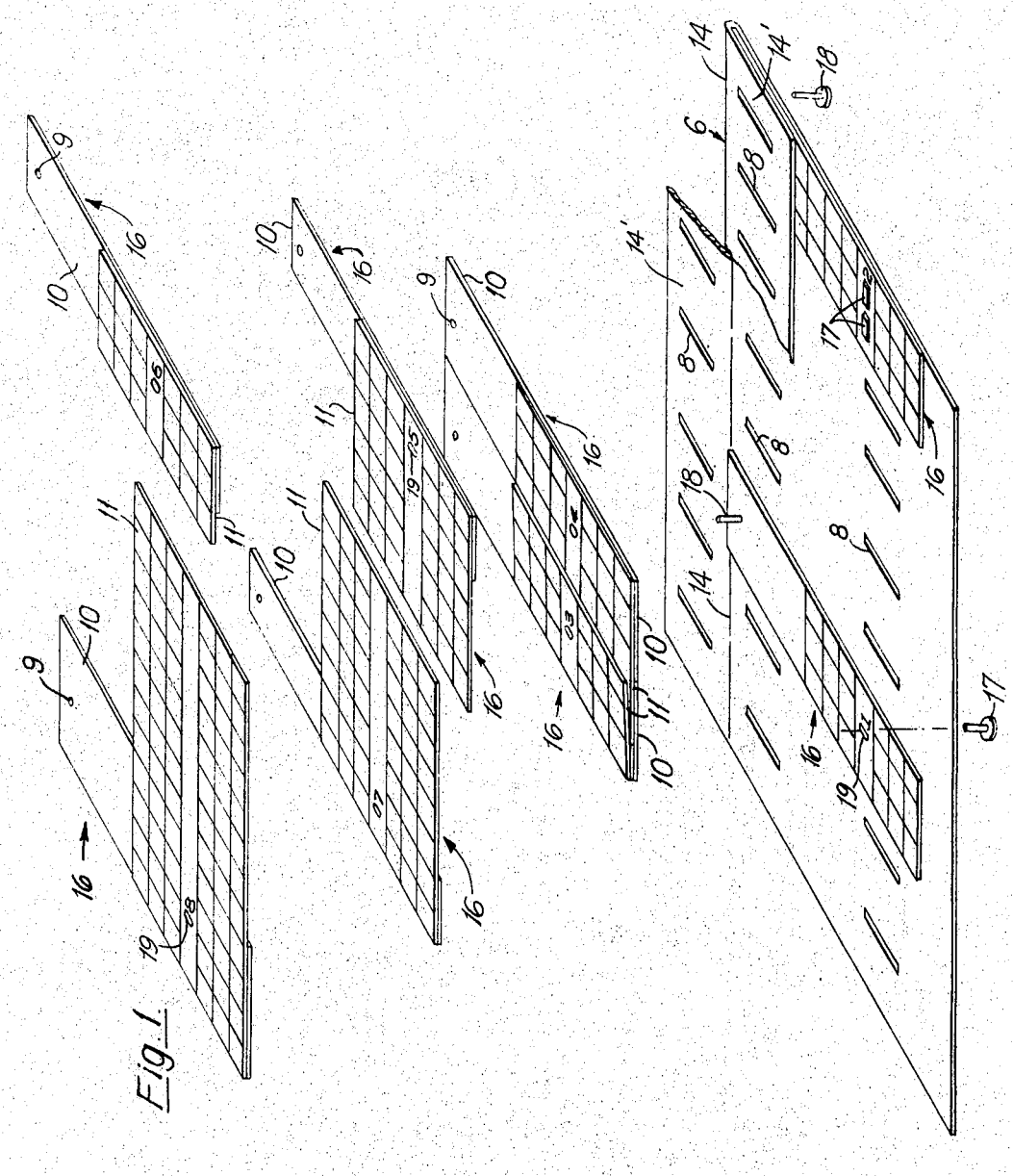
FIG. 1 is an exploded perspective view of a slide member forming part of the apparatus of the present invention.
Figure 13:
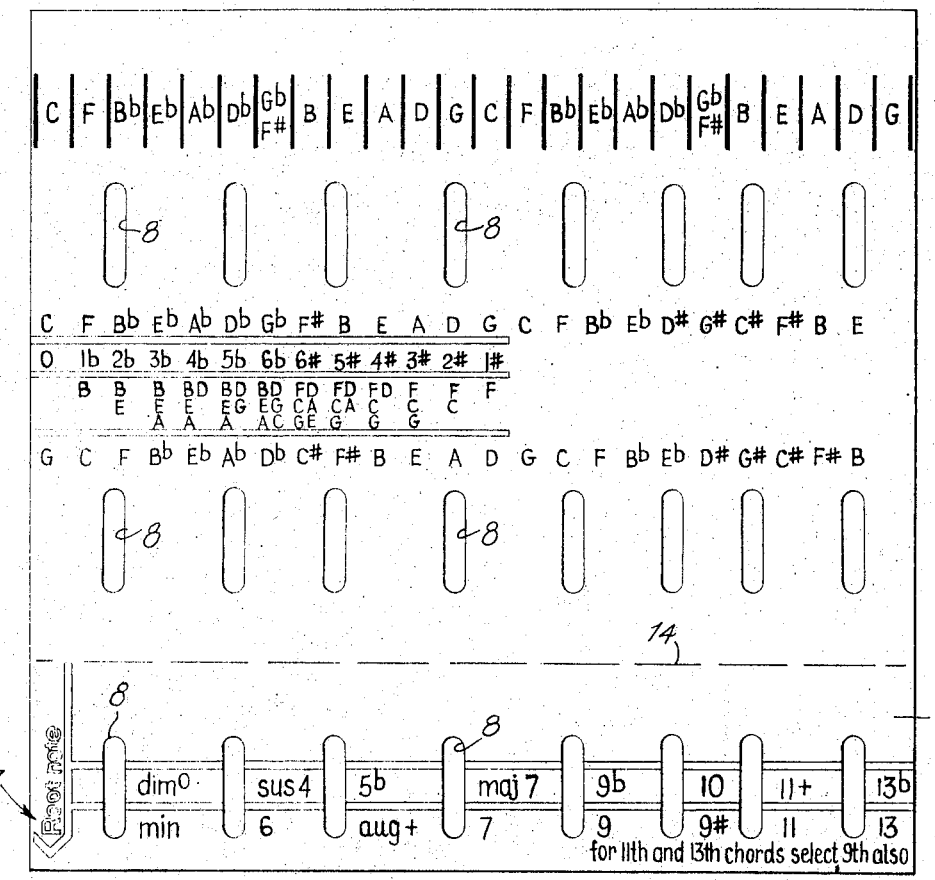
FIG. 13 is a plan view of the master slide and indicator before folding.

The apparatus further includes a transverse sliding member, mounted for sliding movement in the folded case portion 1, and formed by a master slide 6 having a plurality of slide assemblies 16 displaceably mounted thereon. In the particular embodiment selected for illustration, there are eight slide assemblies 16. Main or master slide 6 is illustrated in FIGS. 1 and 13 as arranged to be folded about a fold line 14 to provide an overlapped flap 14'. The master slide is formed with three rows of elongated slots 8, with corresponding slots in the three rows being aligned longitudinally with each other, as will be clearly apparent from FIG. 1. When the master slide is folded about fold line 14, each slot 8 in flap 14' is aligned with a corresponding slot in the middle row of slots, as viewed in FIG. 13. The master slide is arranged to be mounted in casing 1, with flap 14' having its major portion exposed in the guide way or track defined by the edges 12' and 13' of the member 1, and being movable longitudinally of the edges 12' and 13' for movement transversely of the chromatic sequence provided by the keys 4 of the keyboard representation 3. For this purpose, master slide 6 has an arrow 7 which can be aligned with any selected one of the key representations 4. Slots 8 of master slide 6 extend perpendicularly to the direction of movement of the master slide along the keyboard representation 3.

Slots 8 in master slide 6 are provided for slidably mounting slide assemblies 16 on the master slide for movement thereon relative to the direction of movement of master slide 6. As best seen in FIGS. 1 and 3A – 10B, each slide assembly 16 comprises a planar strip 10, of transparent material, having secured to its upper surface and projecting laterally therefrom a panel 11 of transparent material, such as cellulose acetate or any other suitable material, and which panels 11 will overlap other planar strips 10 and panels 11. It will be noted that each slide assembly carries a designated number from 1 to 8. In each of the slide assemblies 16, the upper edge of the associated panel 11 is located at the same distance from the upper edge of the transparent strip 10. In other words, all panels 11 are at the same distance from the upper edges of the associated strips 10.

Each planar strip 10 is formed with a circular hole 9, adjacent its upper hand as viewed in the drawing, and with an oval aperture 19 adjacent the longitudinal midpoint of the associated panel 11. Slide assemblies 16 are mounted on master slide 6, for sliding movement transverse to the direction of movement of master slide 6, by means of bifurcated rivets 17 extending through oval apertures 19 and through the lower row of slots 8, as viewed in FIG. 1, of master slide 6, and further by means of pivot pins 18 extending through the overlapped and aligned slots 8 of master slide 6 and through the circular apertures 9.

Figure 2:
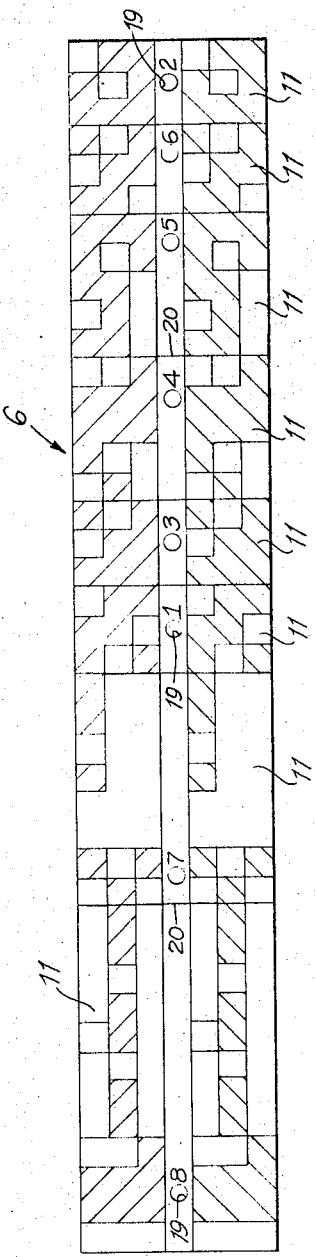
FIG. 2 is a plan view of a sheet of transparent material having eight panels imprinted thereon, formed with respective punched holes for each panel, and arranged to be severed along transversely extending trim lines, to provide the individual transparent panels.

The panels 11 are imprinted on a single elongated rectangular strip of transparent plastics material as illustrated in FIG. 2, and are cut from this single strip by severing along the trim lines 20 extending transversely of the strip. In FIG. 2, the unshaded squares or combinations of squares are red with white characters marked thereon. The squares shaded with section lines running from the upper left to the lower right, and the combination of these squares, are colored black, and the squares or combinations of squares with section lines running from the upper right to the lower left are colored white. The remaining areas of the panels are transparent.

Referring again to FIG. 1, the slide assemblies 1 and 2 are illustrated in position on the master slide 6, with slide assembly 2 being indicated as secured in position by a bifurcated rivet 17 and pivot pin 18, and the slide assemblies 3 and 4 will be positioned on master panel 6 immediately adjacent the left edge of slide assembly 2, with the slide assemblies 5 and 7 being positioned immediately adjacent the right-hand edge of the slide assembly 2. The slide assemblies 8 and 6 will be positioned adjacent the left edge of the slide assembly 1.

Referring to FIG. 13, it will be noted that the row of slots 8, formed in flap 14' adapted to be folded about fold line 14, has two rows of designations extending therealong, the upper row being adjacent the centers of slots 8 and the lower row being adjacent the lower ends of slots 8, as viewed in FIG. 13. The upper ends of slots 8 do not carry any designation adjacent thereto, and this end of each slot 8, being nearest the fold line 14, is the most remote from keyboard representation 3 when flap 14' is folded over about flap 14 and master slide 6 is mounted in case 1. A neutral position is represented when a pin 18 of a slide assembly 16, having its planar strip 10 inserted between flap 14' and the main body of main slide 6, is adjacent the upper end of a slot 8 or near the fold line 14. In the "central" position and the "lower" position of a pin 18 in a slot 8, when the pin 18 is aligned with one of the two rows of designations, it represents a specific interval and, by moving the several slide assemblies 16 on the master slide 6, any interval, or combination of intervals, indicated in a chord symbol may be selected by moving the appropriate slide assembly 16 to the proper position in the slots 8 of folded-over flap 14' of master slide 6. It will be further apparent, particularly from FIG. 1 and FIGS. 3A – 10A, that certain of panels 11 will overlap each other. These panels 11, when the parts are assembled with master slide 6, carrying slide assemblies 16, slidably mounted in casing 1, are disposed beneath the cover portion 2 of casing 1.

When master slide 6 is moved longitudinally of the spaced edges 12' and 13' of casing 1, or perpendicularly to the keys 4, the slide assembly 16, and particularly the panels 11 thereof, will move beneath the windows or apertures 5 in each of the keys 4. By movement of slide assembly 16, perpendicular to the direction of movement of main slide 6, or along slots 8, slide assemblies 16 will move, beneath windows or apertures 5, perpendicularly to keyboard representation 3 and parallel to keys 4.

The overlapping portions of transparent panels 11 are marked in only certain positions where it is required to cancel out the markings on a slide assembly therebeneath. Thus, these panels will bear irregular markings, either in the color of the key or in the color or marking which will show up clearly in the windows or apertures 5. Consequently, when a chord symbol is selected by sliding pointer 7 to the required key 4 of the chromatic sequence provided by the series of keys 4, and by moving appropriate slide assembly 16 to select the chord interval, the distinctive markings will appear in the windows or apertures 5 of the keys comprising the chord symbol, thus indicating the constituent note of the chord symbol.

In conjunction with the indication of the constituent notes of a chord, it is possible to provide additional means on the rear of the master slide, with appropriate windows in the rear of the outer case. One example is that information regarding musical keys can be given to show the number of sharps and flats in any key and which notes within the scales shown are sharpened or flattened; the dominant seventh chord of the key, the relative minor key and the dominant seventh chord of the relative minor key. Also, a transposer can be readily provided, as can also a cycle of keys.

To assemble the apparatus, slide assemblies 16 are mounted on main slide 6, as shown in FIG. 1, with flap 14' not yet folded and with bifurcated rivets 17 extending through the lower-most row of slots 8 in slide 6 and pins 18 extending through the central row of slots 8. Flap 14' is then folded about fold line 14 so that pins 18 extend through the slots 8 in flap 14'. Slide 6 with slide assmblies 16' mounted thereon, is then placed on member 1, as viewed in FIG. 12, with fold line 14 adjacent fold line 12. Member 1 is then folded about the fold lines 12 and 13 so that cover portion 2, carrying the keyboard representation 3 with the keys 4, covers the major portions of the slide assemblies 16, particularly the transparent panels 11 thereof, as seen more particularly in FIG. 14, with flap 14' being exposed between spaced edges 12' and 13' of the member 1. The folded-over portions of member 1 may be secured in position by any suitable means, such as the illustrated eyelets or rivets, and with or without the interposition of border strips at each side edge.

It is believed that the operation of the apparatus will be clear from FIGS. 14 through 17 showing the assembled apparatus. Thus, when the master slide 6, carrying the slide assemblies 16, is moved in the direction to align the arrow 7 with a specific key 4 on the keyboard representation 3, appropriate movement of the slide assemblies transversely of the master slide will provide indications in the apertures 5 on the front of the apparatus. Similarly, appropriate indications will be provided in the apertures on the rear of the apparatus, such as the apertures shown in FIG. 15.

While a specific embodiment of the invention has been shown and described in detail to illustrate the application of the principles of the invention, it will be understood that the invention may be embodied otherwise without departing from such principles.

I claim:

1. An instructional apparatus for converting a chord symbol into its constituent notes comprising, in combination, outer case means, including a cover portion bearing a representation of a keyboard of the pianoforte type and having spaced apart facing longitudinal edges defining an opening therein extending along said keyboard representation, said cover portion further being formed with windows therethrough each aligned with a respective key of the keyboard representation; a master slide slideable within said outer case means longitudinally of the keyboard representation and transversely of the keys thereof; and a plurality of slide assemblies mounted on said master slide for sliding movement therealong perpendicular to the keyboard representation and each provided with means enabling the slide assembly to be slid; said master slide being provided with an indicator portion located in said opening and including an indicator alignable with a selected key of the keyboard representation, and being formed with parallel slots extending perpendicular to the keyboard representation and spaced longitudinally of the keyboard representation, and including slots in said indicator portion, the slots receiving means securing each slide assembly to said master slide; said indicator portion having, adjacent each slot therein, chord symbols marked thereon; said slide assemblies carrying markings thereon adapted to register with said windows for exposure therethrough; whereby said master slide may be moved longitudinally of said keyboard representation into a selected position according to the key note indicated by a chord symbol, after which at least one selected slide assembly may be moved perpendicularly to the keyboard representation in its associated slots in said master slide in accordance with the interval in the chord symbol so that appropriate markings on the slide assemblies appear in the windows of the appropriate keys to indicate the constituent notes of the chord symbol required.

2. An instructional apparatus, as claimed in claim 1, wherein said outer covering means, said master slide, and said slide assemblies are made of plastic material.

3. An instructional apparatus, as claimed in claim 1, wherein said enabling means comprise rivet means secured to each slide assembly and extending through the associated slots in the master slide.

4. An instructional apparatus, as claimed in claim 1, wherein each slide assembly comprises a substantially rectangular strip of transparent material, all of the strips being of the same length, and a rectangular marked panel of transparent material secured to each strip and projecting laterally therefrom; said strips being arranged on said master slide with their longer edges in abutment with each other, and said panels overlapping each other.

* * * * *